United States Patent
Zhang et al.

(10) Patent No.: US 10,324,902 B2
(45) Date of Patent: Jun. 18, 2019

(54) METHOD AND APPARATUS FOR LOCKING FILE IN MEMORY

(71) Applicant: EMC IP Holding Company LLC, Hopkinton, MA (US)

(72) Inventors: Lester Ming Zhang, Beijing (CN); Denny Dengyu Wang, Beijing (CN); Chen Gong, Beijing (CN); Ted Guangkai Zhang, Beijing (CN); Donglei Wang, Beijing (CN); Bean Bin Zhao, Tianjin (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 265 days.

(21) Appl. No.: 15/269,336

(22) Filed: Sep. 19, 2016

(65) Prior Publication Data
US 2017/0091218 A1    Mar. 30, 2017

(30) Foreign Application Priority Data
Sep. 24, 2015 (CN) ..................... 2015 1 0618564.6

(51) Int. Cl.
*G06F 16/00* (2019.01)
*G06F 16/176* (2019.01)
(52) U.S. Cl.
CPC ............................. *G06F 16/1774* (2019.01)
(58) Field of Classification Search
CPC ......... G06F 17/30171; G06F 17/30371; G06F 17/30; G06F 16/1774
See application file for complete search history.

(56) References Cited

U.S. PATENT DOCUMENTS

| | | | | |
|---|---|---|---|---|
| 3,603,937 A * | 9/1971 | Loizides | ........... | G06F 17/30949 707/E17.012 |
| 5,918,229 A * | 6/1999 | Davis | ..................... | G06F 9/5016 711/147 |
| 5,987,506 A * | 11/1999 | Carter | ................... | G06F 9/5016 709/213 |
| 6,032,216 A * | 2/2000 | Schmuck | .................. | G06F 9/52 710/200 |
| 6,363,387 B1 * | 3/2002 | Ponnekanti | ......... | G06F 16/2308 707/E17.005 |
| 6,606,626 B1 * | 8/2003 | Ponnekanti | ......... | G06F 16/2308 707/E17.005 |
| 7,865,663 B1 * | 1/2011 | Nelson | ..................... | G06F 13/42 711/112 |
| 7,996,363 B2 * | 8/2011 | Girkar | ............... | G06F 17/30575 707/638 |
| 9,558,796 B2 * | 1/2017 | Ebeling | .............. | H03K 19/1776 707/E17.032 |

(Continued)

*Primary Examiner* — Anh Ly
(74) *Attorney, Agent, or Firm* — Krishnendu Gupta; Lesley Leonessa

(57) ABSTRACT

Embodiments of the present disclosure relate to a method and apparatus for locking a file in a memory. The method comprises enabling a thread to obtain a mixed lock of a file. The method further comprises, in response to enabling the thread to obtain the mixed lock, enabling a further thread to obtain a shared lock of the file, and prevent the further thread from obtaining the exclusive lock or mixed lock of the file. By adding a new mixed lock to a traditional read and write lock, embodiments of the present disclosure improve concurrent access performance of the file system.

14 Claims, 5 Drawing Sheets

(56) References Cited

U.S. PATENT DOCUMENTS

| | | | |
|---|---|---|---|
| 10,007,671 B1* | 6/2018 | Bono | G06F 17/30088 |
| | | | 707/E17.005 |
| 10,055,309 B1* | 8/2018 | Samad | G06F 11/1464 |
| | | | 707/E17.009 |
| 2005/0066095 A1* | 3/2005 | Mullick | G06F 16/1774 |
| | | | 710/200 |
| 2005/0262170 A1* | 11/2005 | Girkar | G06F 17/30575 |
| | | | 707/E17.032 |
| 2007/0044084 A1* | 2/2007 | Wang | G06F 11/3608 |
| | | | 717/151 |
| 2012/0284234 A1* | 11/2012 | Mashtizadeh | G06F 17/30233 |
| | | | 707/655 |
| 2014/0068127 A1* | 3/2014 | Baron | G06F 9/526 |
| | | | 710/200 |
| 2015/0378783 A1* | 12/2015 | Tarasuk-Levin | G06F 9/45558 |
| | | | 718/1 |
| 2016/0072886 A1* | 3/2016 | Lin | G06F 16/182 |
| | | | 709/213 |
| 2017/0091218 A1* | 3/2017 | Zhang | G06F 17/30171 |
| | | | 707/E17.045 |

* cited by examiner

METHOD AND APPARATUS FOR LOCKING FILE IN MEMORY

RELATED APPLICATION

This application claim priority from Chinese Patent Application No. CN201510618564.6, filed on Sep. 24, 2015 at the State Intellectual Property Office, China, titled "METHOD AND APPARATUS FOR LOCKING FILE IN MEMORY," the contents of which is herein incorporated by reference in its entirety.

FIELD

Embodiments of the present disclosure generally relate to storage technology, and more specifically to a method and apparatus for locking a file in a memory.

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems are very concerned with providing customers with an efficient data storage solution that minimizes cost while meeting customer data storage needs. It would be beneficial for such companies to have a way for reducing the complexity of implementing data storage.

SUMMARY

In view of the above, embodiments of the above disclosure provide a method and apparatus for locking a file in a memory, which can improve concurrent access performance and read and write performance of the file system.

According to an aspect of the present disclosure, there is disclosed a method for locking a file in a memory, the method comprises enabling a thread to obtain a mixed lock of the file. The method further comprises, in response to enabling the thread to obtain the mixed lock, enabling a further thread to obtain a shared lock of the file, and preventing the further thread from obtaining the exclusive lock or the mixed lock of the file.

BRIEF DESCRIPTION OF DRAWINGS

Features, advantages and other aspects of embodiments of the present disclosure will be made more apparent in combination with figures and with reference to the following detailed description. Several embodiments of the present disclosure are illustrated here in an example and unrestrictive manner. In the figures.

DETAILED DESCRIPTION

Figure 1:
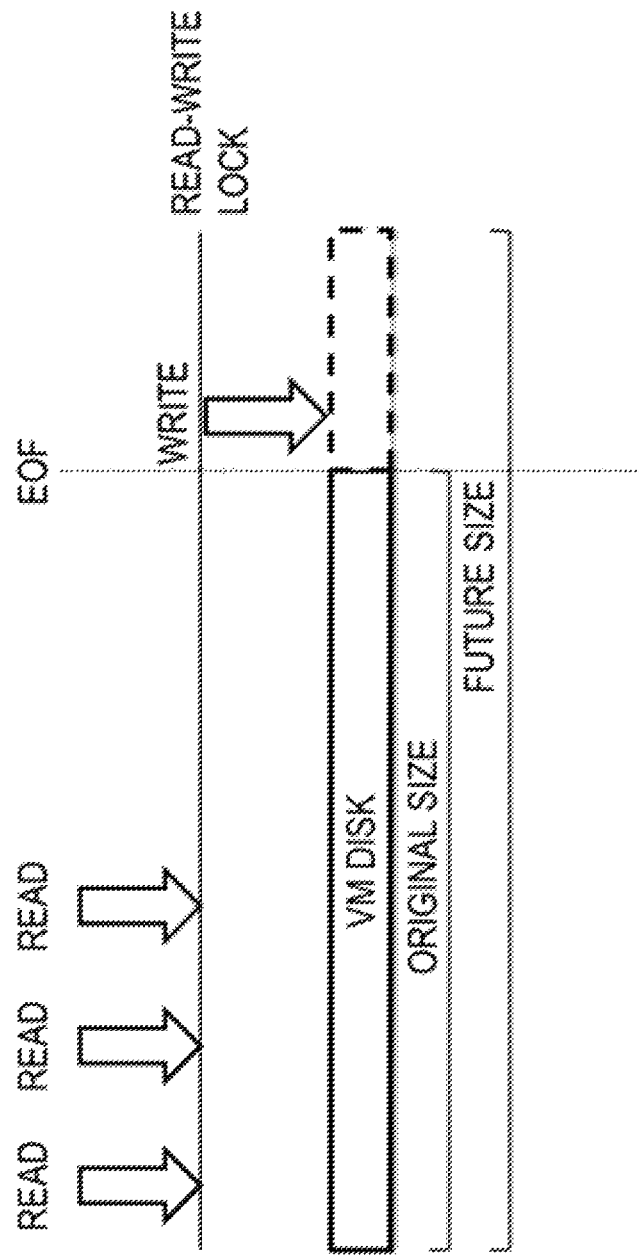
FIG. 1 illustrates an example of file read and write control upon file expansion in the traditional method.

Example embodiments of the present disclosure will be described in detail with reference to figures. The flowcharts and block diagrams in the figures illustrate system architectures, functions and operations executable by the method and apparatus according to the embodiments of the present disclosure. It should be appreciated that each block in the flowcharts or block diagrams may represent a module, a program segment, or a part of code, which contains one or more executable instructions for performing specified logic functions. It should also be noted that, in some alternative implementations, the functions noted in the block may occur out of the order noted in the figures. For example, two blocks shown consecutively may be performed in parallel substantially or in an inverse order, depending on involved functions. It should also be noted that each block in the block diagrams and/or flow charts and a combination of blocks in block diagrams and/or flow charts may be implemented by a dedicated hardware-based system for executing a specified function or operation or may be implemented by a combination of dedicated hardware and computer instructions.

The terms "comprise", "include" and like terms used in the text should be understood as open-ended terms, namely, "comprise/include, but not limited to". The term "based on" means "at least partly based on". The term "an embodiment" represents "at least one embodiment", and the terms "another embodiment" and "a further embodiment" represent "at least one additional embodiment". Relevant definitions of other terms will be given in the description below.

It should be appreciated that these example embodiments are presented herein to enable those skilled in the art to better understand and thereby implement embodiments of the present disclosure, without limiting the scope of the present disclosure in any manner.

Traditionally, in a file system, a read-write lock (RW lock) is widely used to protect limited resources and prevent the unallowable concurrent access. Generally, RW lock generally comprises two types of locks, that is, a shared lock (SH lock) and an exclusive lock (EX lock). Typically, if a thread adds a shared lock to data, other threads can only add shared locks to the data and cannot add an exclusive lock. Conventionally, threads obtaining the shared lock can only read data and cannot write data. Typically, if a thread adds an exclusive lock to the data, other threads cannot add any form of file lock to the data any more, and the thread obtaining the exclusive lock can read data as well as write data.

In a traditional file lock environment, when a file, such as virtual machine file, needs to be expanded or truncated, the thread needs to obtain and hold the exclusive lock. Therefore, typically, even though the original file does not change, other read threads cannot access the file. Hence, generally, the current file lock mechanism seriously affects the concurrent access performance of the file system. For example, conventionally, in a use instance of a virtual machine, such as VMware, when the virtual machine disk is expanded, other read threads to the virtual machine disk are blocked until the expansion operation is completed.

Therefore, typically, it becomes a problem urgently to be solved how to improve the current file locking method and implement more efficient concurrent access control in the file system in order to improve the read and write performance of the file system.

According to an aspect of the present disclosure, there is disclosed a method for locking a file in a memory, the method comprises enabling a thread to obtain a mixed lock of the file. The method further comprises, in response to enabling the thread to obtain the mixed lock, enabling a further thread to obtain a shared lock of the file, and preventing the further thread from obtaining the exclusive lock or the mixed lock of the file.

According to an embodiment of the present disclosure, the step of enabling a thread to obtain a mixed lock of a file comprises enabling the thread to perform a read operation or a write operation for the file. According to another embodiment of the present disclosure, the read operation is able to read a data block before an end of file (EOF) for the file, and the write operation is able to write a data block after the EOF.

According to an embodiment of the present disclosure, the step of enabling a further thread to obtain a shared lock of the file comprises: enabling the further thread to perform a read operation for an unchanged data block in the file in response to enabling the further thread to obtain the shared lock of the file, wherein the unchanged data block represents a data block before the EOF.

According to an embodiment of the present disclosure, if the file is expanded, the EOF represents the last data block before the file is expanded; and if the file is truncated, the EOF represents a data block prior to a truncated data block in the file. According to another embodiment of the present disclosure, the method further comprises updating a size of the file and the EOF if the EOF is read.

According to an embodiment of the present disclosure, the step of preventing the further thread from obtaining the exclusive lock or mixed lock of the file comprises: blocking a request by the further thread requesting for the exclusive lock or the mixed lock of the file.

According to an embodiment of the present disclosure, wherein the mixed lock and the shared lock are convertible to each other after enabling the thread to obtain the mixed lock of the file. The method further comprises: in response to converting the mixed lock to the shared lock, sending an indication to a request queue; and in response to converting the shared lock to the mixed lock, preventing from sending the indication to the request queue. According to another embodiment of the present disclosure, the method further comprises: if the current lock of the file conflicts with the mixed lock, suspending a conversion from the current lock to the mixed lock. According to a further embodiment of the present disclosure, the method further comprises updating a size of the file and the EOF after converting the shared lock to the mixed lock.

According to an embodiment of the present disclosure, the file is a virtual machine file.

According to another aspect of the present disclosure, there is disclosed an apparatus for locking a file in a memory. The apparatus comprises a locking means configured to enable a thread to obtain a mixed lock of a file. The apparatus further comprises a controlling unit configured to, in response to enabling the thread to obtain the mixed lock, enable a further thread to obtain a shared lock of the file, and prevent the further thread from obtaining the exclusive lock or mixed lock of the file.

Example embodiments of the present disclosure may bring about at least one of the following technical effects: a new type of file lock is provided, namely, mixed lock (MX lock), which is adapted for read and write control of the shared file, and the mixed lock can implement efficient concurrent access control in the file system and thereby improve concurrent access performance of the file system.

FIG. 1 illustrates an example of file read and write control upon file expansion in the traditional method. For example, in a virtual machine system, when a file (such as a virtual machine disk) is expanded, the file before the end of file (EOF) represents an original size before the expansion, and the file after EOF (e.g., a portion in a dash-line box in FIG. 1) represents the expanded file size. A sum of the original size and the expanded file size represents a future size of the file after expansion.

In the example in FIG. 1, for the virtual machine disk, when the disk is being expanded, the data block after EOF is being written, and now a write thread obtains an exclusive lock of the virtual machine disk. Therefore, the data block before the EOF cannot be read, namely, other read threads cannot obtain a shared lock of the data block before the EOF. Hence, in the traditional method, when a file is expanded, the file is added an exclusive lock, and thus the unchanged data block in the file cannot be read by other threads so that the performance of concurrent access to the file seriously degrades.

Figure 2:
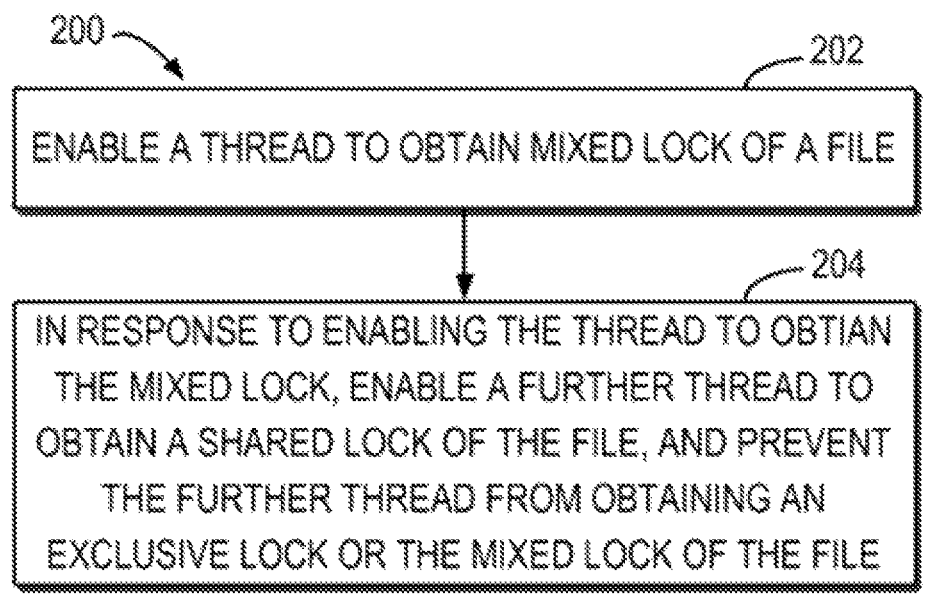
FIG. 2 illustrates a flow chart of a method 200 for locking a file in a memory according to an embodiment of the present disclosure.

Referring to FIG. 2, which illustrates a flow chart of a method 200 of locking a file in a memory according to an embodiment of the present disclosure. At step 202, a thread is enabled to obtain a mixed lock (MX lock) of the file. The mixed lock is a newly-defined file lock which is parallel to the shared lock and the exclusive lock among the file locks. According to an embodiment of the present disclosure, in the state of the mixed lock, a read operation or a write operation may be performed for the file through a thread, wherein the read operation can read a data block before the EOF, and the write operation can write a data block after the EOF.

Further referring to FIG. 2, at step 204, in response to obtaining by the thread the mixed lock, a further thread is enabled to obtain a shared lock of the file, but the further thread is prevented from obtaining the exclusive lock or mixed lock of the file. That is, the further thread in not allowed to obtain any of the exclusive lock and mixed lock of the file. For example, in the state of the mixed lock, in common with the shared lock, other read operation threads may obtain the shared lock of the file; and in common with the exclusive lock, a mixed lock of one file can only be obtained by one thread which may execute a read operation or a write operation of the file.

Figure 3:
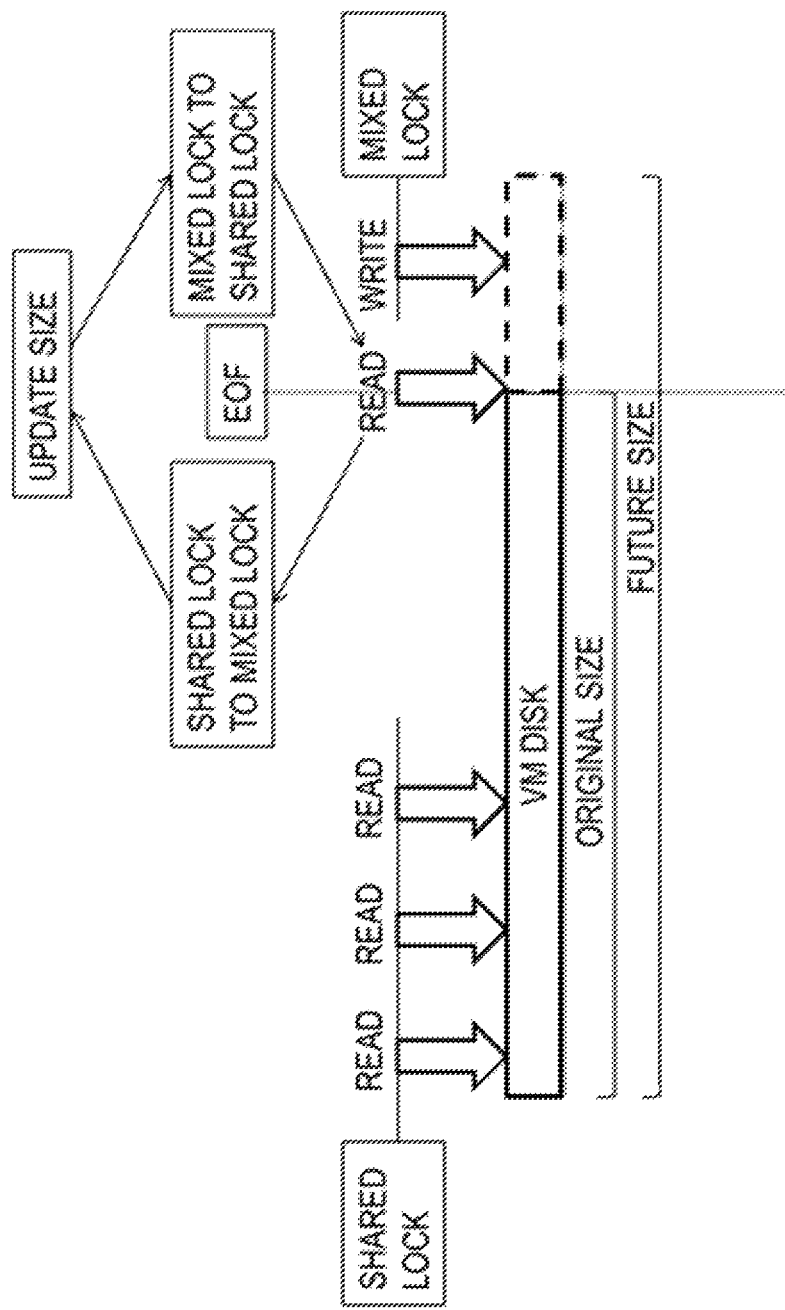
FIG. 3 illustrates an example of file read and write control upon file expansion according to an embodiment of the present disclosure.

Referring to FIG. 3, which illustrates an example of file read and write control upon file expansion according to an embodiment of the present disclosure, wherein the size of a virtual machine disk is being expanded, namely, the capacity of disk file is being expanded. Data blocks before the EOF are unchanged data blocks during file expansion, and data blocks after the EOF are data blocks being expanded. Similar to the method in FIG. 1, a portion in a dash-line box in FIG. 3 is expanded size of the file. The example shown in FIG. 3 differs from the method in FIG. 1 in that when the size of virtual machine disk is expanded, a mixed lock is added to the virtual machine disk file. In the state of the mixed lock in the embodiment of the present disclosure, the thread obtaining the mixed lock may perform a read operation or a write operation of the whole file, and a further thread may still obtain the shared lock of the file (for example, three read operation threads obtaining the shared lock on the left side of FIG. 3) so as to read the data blocks before the EOF upon file expansion.

According to an embodiment of the present disclosure, if the further thread obtains the shared lock of the file, the further thread performs a read operation for an unchanged data block in the file, wherein the unchanged data block represents a data block before the EOF. For example, in the example in FIG. 3, other threads may read the data blocks before the EOF, that is, the data blocks of the original file.

According to an embodiment of the present disclosure, when the file is expanded, the EOF represents the last data block before the file is expanded; and when the file is truncated, the EOF represents a data block prior to the truncated data block in the file.

According to another embodiment of the present disclosure, the size of the file and the EOF are updated when the EOF is read. For example, in FIG. 3, when the EOF is being read, to maximize the scope of the read operation, the EOF will be updated automatically. If the capacity after the EOF has already been expanded, the file size is updated as the expanded file size, and the EOF is updated as the ending position of the expanded file.

According to an embodiment of the present disclosure, the mixed lock and the shared lock are convertible to each other after the mixed lock of the file is obtained by the thread, wherein if the mixed lock is converted to the shared lock, an indication is sent to a request queue (such as threads requesting the mixed lock); and if the shared lock is converted to the mixed lock, the indication is not sent to a request queue (such as the threads requesting the mixed lock). For example, in the example in FIG. 3, it illustrates the conversion process between the mixed lock and the shared lock.

According to another embodiment of the present disclosure, if the current lock of the file conflicts with the mixed lock, the conversion operation from the current lock to the mixed lock is suspended. For example, if other thread is holding the mixed lock of the file, the conversion operation cannot be started, so the conversion operation needs to be placed in the queue to queue up. Once the current mixed lock of the file is released, this conversion operation is executed immediately. According to a further embodiment of the present disclosure, the size of the file and the EOF are updated after the shared lock is converted to the mixed lock. For example, after the shared lock is converted to the mixed lock every time, the size of the file and the EOF are updated automatically.

According to a further embodiment of the present disclosure, mutual conversion may be performed between the mixed lock and the exclusive lock. For example, the mixed lock may be converted to the exclusive lock without notifying other queues of this conversion. If other shared locks are added to the file, the conversion operation is suspended. The exclusive lock may be converted to the mixed lock, and meanwhile the conversion is notified to other queues, for example, the shared lock thread in the queue is notified to obtain the shared lock of the file.

According to an embodiment of the present disclosure, if there is a request by a further thread requesting for the exclusive lock or mixed lock of the file, the request is blocked. For example, the threads requesting the exclusive lock and the mixed lock are added to the queue to wait for the release of the mixed lock of the file.

According to an embodiment of the present disclosure, the file is a virtual machine file. For example, the file is a file in VMware, and the method 200 may be used for a Network Attached Storage (NAS) file system.

In the embodiment of the method 200, when the file is expanded or truncated, the thread requesting for the shared lock can still continue to access data blocks before the EOF, thereby effectively improving the concurrent access performance of the file system.

Figure 4:
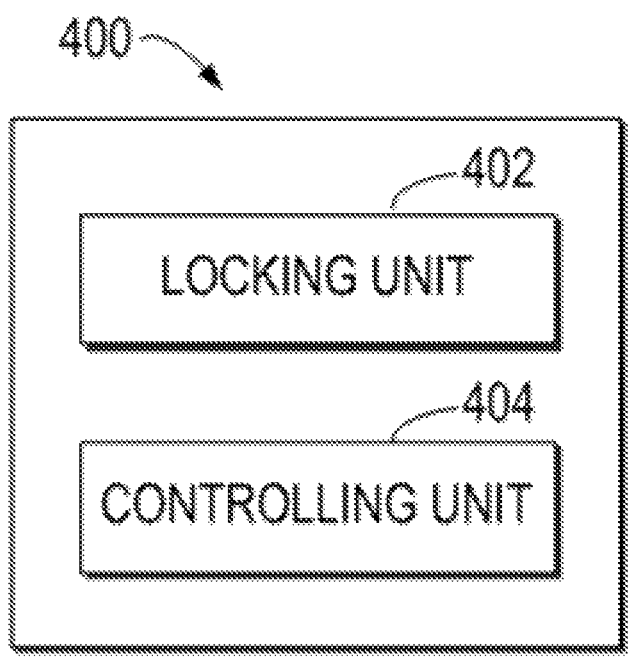
FIG. 4 illustrates a block diagram of an apparatus 400 for locking a file in a memory according to an embodiment of the present disclosure.

FIG. 4 illustrates a block diagram of an apparatus 400 for locking a file in a memory according to an embodiment of the present disclosure. The apparatus 400 comprises a locking unit 402 configured to enable a thread to obtain a mixed lock of a file. The apparatus 400 further comprises a controlling unit 404 configured to, in response to enabling the thread to obtain the mixed lock, enable a further thread to obtain a shared lock of the file, and prevent the further thread from obtaining the exclusive lock or the mixed lock of the file.

According to an embodiment of the present disclosure, the locking means 402 is further configured to: enable the thread to perform a read operation or a write operation for the file. According to another embodiment of the present disclosure, the read operation can read a data block before the EOF for the file, and the write operation can write a data block after the EOF.

According to an embodiment of the present disclosure, the controlling unit 404 is further configured to: in response to enabling the further thread to obtain the shared lock of the file, enable the further thread to perform a read operation for an unchanged data block in the file, wherein the unchanged data block represents a data block before the EOF.

According to an embodiment of the present disclosure, if the file is expanded, the EOF represents the last data block before the file is expanded; and if the file is truncated, the EOF represents a data block prior to the truncated data block in the file. According to another embodiment of the present disclosure, the controlling unit 404 is further configured to update a size of the file and the EOF if the EOF is read.

According to an embodiment of the present disclosure, the controlling unit 404 is further configured to block a request by a further thread requesting for the exclusive lock or mixed lock of the file.

According to an embodiment of the present disclosure, the mixed lock and the shared lock are convertible to each other after the mixed lock of the file is obtained by the thread. The apparatus 400 further comprises a converting unit (not shown) configured in a way that: if the mixed lock is converted to the shared lock, an indication is sent to a request queue; and if the mixed lock is converted to the shared lock, the indication is not sent to the request queue. According to another embodiment of the present disclosure, the converting unit 404 is further configured in a way that if the current lock of the file conflicts with the mixed lock, the conversion operation from the current lock to the mixed lock is suspended. According to a further embodiment of the present disclosure, the converting unit 404 is further configured to update a size of the file and the EOF after the shared lock is converted to the mixed lock.

According to an embodiment of the present disclosure, the file is a virtual machine file.

It should be appreciated that the apparatus 400 may be implemented in various manners. For example, in some embodiments, the apparatus 400 may be implemented in software, hardware or the combination thereof. The hardware part can be implemented by a special logic, and the software part can be stored in a memory and executed by a proper instruction execution system such as a microprocessor or a design-specific hardware. Those skilled in the art may understand that the above method and system may be implemented with a computer-executable instruction and/or in a processor controlled code, for example, such code is provided on a carrier medium such as a magnetic disk, CD, or DVD-ROM, or a programmable memory such as a read-only memory or a data carrier such as an optical or electronic signal carrier. The apparatus and their units in the embodiments of the present disclosure may be implemented by hardware circuitry such as a very large scale integrated circuit or gate array, a semiconductor such as logical chip or transistor, or a programmable hardware device such as a field-programmable gate array, or a programmable logical device, or implemented by software executed by various kinds of processors, or implemented by combination of the above hardware circuitry and software.

It should be noted that although a plurality of units or sub-units of the apparatus have been mentioned in the above detailed depiction, such partitioning is merely example and non-compulsory. In actuality, according to the embodiments of the present disclosure, the features and functions of the above described two or more units may be embodied in one unit. On the contrary, the features and functions of the above described one unit may be further embodied in more units.

Figure 5:
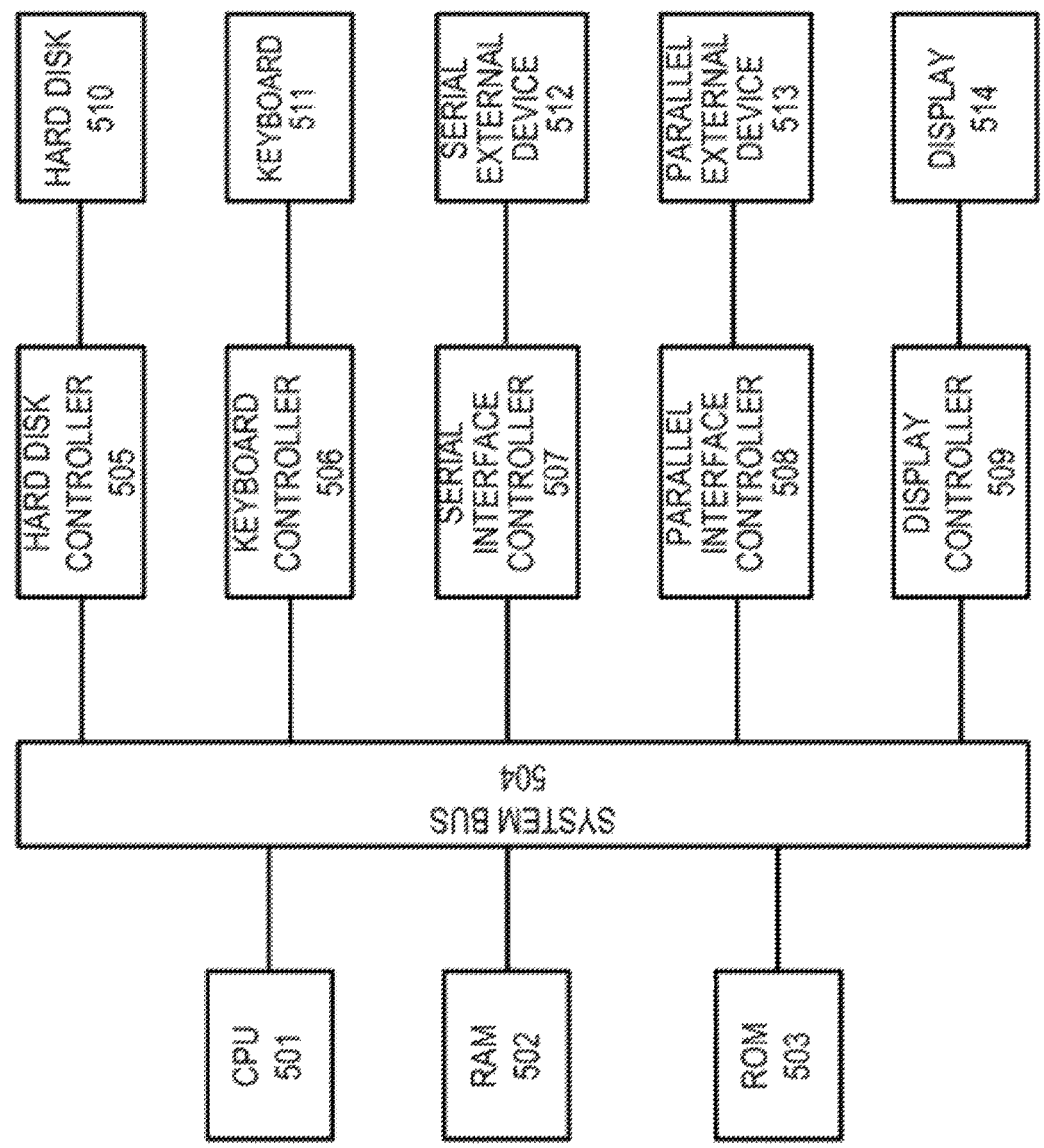
FIG. 5 illustrates a block diagram of a computer apparatus 500 in which an embodiment of the present disclosure may be implemented.

Reference is made to FIG. 5 to describe a computer apparatus in which an embodiment of the present disclosure may be implemented. FIG. 5 illustrates a block diagram of a computer apparatus 500 in which an embodiment of the present disclosure may be implemented.

The computer system as shown in FIG. 5 comprises: a CPU (central processing unit) 501, a RAM (random access memory) 502, a ROM (read only memory) 503, a system bus 504, a hard disk controller 505, a keyboard controller 506, a serial interface controller 507, a parallel interface controller 508, a display controller 509, a hard disk 510, a keyboard 511, a serial external device 512, a parallel external device 513 and a display 514. In these devices, what are coupled to the system bus 504 include the CPU 501, the RAM 502, the ROM 503, the hard disk controller 505, the keyboard controller 506, the serial interface controller 507, the parallel interface controller 508, and the display controller 509. The hard disk 510 is coupled to the hard disk controller 505, the keyboard 511 is coupled to the keyboard controller 506, the serial external device 512 is coupled to the serial interface controller 507, the parallel external device 513 is coupled to the parallel interface controller 508, and the display 514 is coupled to the display controller 509. It should be understood that the structural block diagram as shown in FIG. 5 is only illustrated for example purposes, not for limiting the scope of the present disclosure. In some cases, some devices may be added or reduced dependent on specific situations. The embodiments of the present disclosure may be stored in a storage device such as hardware 510 of the above computer as a computer program code, and when it is loaded into for example a memory to run, it enables the CPU 501 to execute the method for locking a file in a memory according to an embodiment of the present disclosure.

What are described above are only embodiments of the present disclosure and not intended to limit embodiments of the present disclosure. Embodiments of the present disclosure may have various modifications and variations. Any modifications, equivalent substitutions and improvements made within the spirit and principle of embodiments of the present disclosure all should be included in the protection scope of embodiments of the present disclosure.

What is claimed is:

1. A method for locking a file in a memory, comprising:
    enabling a thread to obtain a mixed lock of the file, wherein enabling the thread to obtain the mixed lock of the file comprises enabling the thread to perform a read operation or a write operation for the file, wherein the read operation is able to read a data block before an end of file (EOF) for the file, and the write operation is able to write a data block after the EOF; and
    in response to enabling the thread to obtain the mixed lock,
        enabling a further thread to obtain a shared lock of the file, wherein enabling the further thread to obtain the shared lock of the file comprises in response to enabling the further thread to obtain the shared lock of the file, enabling the further thread to perform a read operation for an unchanged data block in the file, the unchanged data block representing a data block before the EOF for the file; and
        preventing the further thread from obtaining one or more of an exclusive lock of the file and the mixed lock of the file.

2. The method according to claim 1, wherein if the file is expanded, the EOF represents a last data block before the file is expanded, and
    wherein if the file is truncated, the EOF represents a data block prior to a truncated data block in the file.

3. The method according to claim 1, further comprising: updating a size of the file and the EOF if the EOF is read.

4. The method according to claim 1, wherein preventing the further thread from obtaining an exclusive lock or the mixed lock of the file comprises:
    blocking a request by the further thread requesting for the exclusive lock or the mixed lock of the file.

5. The method according to claim 1, wherein the mixed lock and the shared lock are convertible to each other after enabling the thread to obtain the mixed lock of the file, and the method further comprises:
    in response to converting the mixed lock to the shared lock, sending an indication to a request queue; and
    in response to converting the shared lock to the mixed lock, preventing from sending the indication to the request queue.

6. The method according to claim 5, wherein the method further comprises:
    in response to a current lock of the file conflicting with the mixed lock, suspending a conversion from the current lock to the mixed lock.

7. The method according to claim 5, further comprising: updating a size of the file and the EOF after converting the shared lock to the mixed lock.

8. The method according to claim 1, wherein the file is a virtual machine file.

9. An apparatus for locking a file in a memory, comprising:
    a locking unit configured to:
        enable a thread to obtain a mixed lock of the file, and
        enable the thread to perform a read operation or a write operation for the file, wherein the read operation is able to read a data block before an end of file (EOF) for the file, and the write operation is able to write a data block after the EOF; and
    a controlling unit configured to:
        in response to enabling the thread to obtain the mixed lock, enable a further thread to obtain a shared lock of the file, and prevent the further thread from obtaining one or more of an exclusive lock of the file and the mixed lock of the file, and in response to enabling the further thread to obtain the shared lock of the file, enable the further thread to perform a read operation for an unchanged data block in the file, the unchanged data block representing a data block before an EOF for the file.

10. The apparatus according to claim 9, wherein if the file is expanded, the EOF represents a last data block before the file is expanded; and wherein if the file is truncated, the EOF represents a data block prior to a truncated data block in the file.

11. The apparatus according to claim 9, wherein the controlling unit further configured to:

update a size of the file and the EOF if the EOF is read.

12. The apparatus according to claim 9, wherein the controlling unit further configured to:

block a request by the further thread requesting for the exclusive lock or the mixed lock of the file.

13. The apparatus according to claim 9, wherein the mixed lock and the shared lock are convertible to each other after enabling the thread to obtain the mixed lock of the file, and the apparatus further comprises:

a converting unit configured to:

in response to converting the mixed lock to the shared lock, send an indication to a request queue; and in response to converting the shared lock to the mixed lock, prevent from sending the indication to the request queue.

14. The apparatus according to claim 13, wherein the converting unit further configured to:

in response to a current lock of the file conflicting with the mixed lock, suspend a conversion from the current lock to the mixed lock.

* * * * *